(12) United States Patent
Komori et al.

(10) Patent No.: US 8,585,298 B2
(45) Date of Patent: Nov. 19, 2013

(54) WHEEL BEARING APPARATUS INCORPORATED WITH A ROTATION SPEED DETECTING APPARATUS

(75) Inventors: Kazuo Komori, Iwata (JP); Yasuhiro Aritake, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/617,016

(22) Filed: Sep. 14, 2012

(65) Prior Publication Data
US 2013/0028548 A1 Jan. 31, 2013

Related U.S. Application Data

(63) Continuation of application No. PCT/JP2011/056554, filed on Mar. 18, 2011.

(30) Foreign Application Priority Data

Mar. 18, 2010 (JP) ................................ 2010-062303

(51) Int. Cl.
*F16C 33/72* (2006.01)
(52) U.S. Cl.
USPC ........................... 384/544; 384/448; 384/489
(58) Field of Classification Search
USPC .................. 384/544, 589, 448, 484–486, 489
See application file for complete search history.

(56) References Cited

U.S. PATENT DOCUMENTS

| | | | |
|---|---|---|---|
| 5,814,984 A * | 9/1998 | Ohmi et al. | 384/448 |
| 8,393,795 B2 * | 3/2013 | Aritake et al. | 384/489 |
| 2007/0172164 A1 * | 7/2007 | Takada | 384/448 |

FOREIGN PATENT DOCUMENTS

| | | |
|---|---|---|
| JP | 2004-354299 | 12/2004 |
| JP | 2005-265826 | 9/2005 |
| JP | 2005-299768 | 10/2005 |
| JP | 2010190421 A * | 9/2010 |

* cited by examiner

*Primary Examiner* — Thomas R Hannon
(74) *Attorney, Agent, or Firm* — Harness, Dickey & Pierce, P.L.C.

(57) ABSTRACT

A wheel bearing apparatus incorporating a rotation speed detecting apparatus has an outer member, an inner member, double row rolling elements, a pulser ring, a cup-shaped sensor cap and a rotation speed sensor. The sensor cap is press-formed from anti-corrosion steel sheet into a cup-shaped configuration with a cylindrical fitting portion, to be press-fit into the end of the outer member, and a bottom portion, extending radially inward from the fitting portion to cover the inner-side end of the inner member. The rotation speed sensor is oppositely arranged so that it abuts or is positioned in close proximity to the bottom portion and accordingly the pulser ring. The rotation speed sensor and pulser ring oppose one another a predetermined axial air gap via the bottom portion. An elastic member is pressed and elastically deformed between the fitting portion of the sensor cap and the end of the outer member.

15 Claims, 9 Drawing Sheets

WHEEL BEARING APPARATUS INCORPORATED WITH A ROTATION SPEED DETECTING APPARATUS

CROSS-REFERENCE TO RELATED APPLICATIONS

This application is a continuation of International Application No. PCT/JP2011/056554, filed Mar. 18, 2011, which claims priority to Japanese Application No. 2010-062303, filed Mar. 18, 2010. The disclosures of the above applications are incorporated herein by reference.

FIELD

The present disclosure generally relates to a wheel bearing apparatus to rotationally support a wheel of a vehicle, such as an automobile, with respect to a suspension apparatus and, more particularly, to a wheel bearing apparatus incorporating a rotation speed detecting apparatus to detect wheel speed of a vehicle and intended to improve the sealability of the wheel bearing.

BACKGROUND

A wheel bearing apparatus that can support a wheel of vehicle, with respect to a suspension apparatus, and incorporating a rotation speed detecting apparatus to control the anti-lock braking system (ABS) and detecting the rotation speed of the wheel is generally known. Such a bearing apparatus is generally provided with a sealing apparatus arranged between the inner and outer members rotating relative to each other via rolling elements contained between them. The sealing apparatus is integrally formed with a magnetic encoder with magnetic poles alternately arranged along its circumference. A rotation speed detecting apparatus includes the magnetic encoder and a rotation speed sensor to detect change of magnetic poles of the magnetic encoder caused by the rotation of a wheel.

A rotation speed sensor mounted on a knuckle, after the wheel bearing apparatus is mounted on the knuckle forming a suspension apparatus, is generally known. However, recently there has been proposed a wheel bearing apparatus incorporating a rotational speed detecting apparatus. The rotation speed sensor is built into the wheel bearing in order to solve complexity in adjusting operation of the air gap, between the rotation speed sensor and the magnetic encoder, and to reduce the size of the wheel bearing apparatus.

FIG. 8 is one example of a wheel bearing apparatus incorporating a rotational speed detecting apparatus. This wheel bearing apparatus has an outer member 51 to be secured to a knuckle (not shown) forming a stationary member. An inner member 52 is inserted into the outer member 51 via double row balls 53, 53. The inner member 52 includes a wheel hub 55 and an inner ring 56 fit onto the wheel hub 55.

The outer member 51 has an outer circumference with an integrally formed body mounting flange 51b. The outer member inner circumference includes double row outer raceway surfaces 51a, 51a. The inner member 52 is formed with double row inner raceway surfaces 55a, 56a arranged opposite to the outer raceway surfaces 51a, 51a of the outer member 51. One inner raceway surface 55a of the double row inner raceway surfaces 55a, 56a is integrally formed on the outer circumference of the wheel hub 55. The other inner raceway surface 56a is formed on the outer circumference of the inner ring 56. The inner ring 56 is press-fit onto a cylindrical portion 55, axially extending from the inner raceway surface 55a, of the wheel hub 55. Double row balls 53, 53 are contained between the outer and inner raceway surfaces and are freely rollably held by cages 57, 57.

The wheel hub 55 is integrally formed with a wheel mounting flange 54 for mounting a wheel (not shown) on its outer circumference. The inner ring 56 is axially secured by a caulked portion 58. The caulked portion 58 is formed by plastically deforming the end of the cylindrical portion 55b. A seal 59 and a cover 63 are mounted on both ends of the outer member 51 to prevent leakage of lubricating grease sealed within the bearing and entry of rain water or dust from the outside into the bearing.

A magnetic encoder 60 is press-fit onto the outer circumference of the inner ring 56. The magnetic encoder 60 has an annular supporting member 61 formed from magnetic metal sheet. The annular support member 61 has a substantially L-shaped cross-section. An encoder body 62 is adhered to the side of the annular supporting member 61. The encoder body 62 is a permanent magnet formed of rubber mingled with ferrite powder. The magnet has N and S poles alternately arranged along the encoder body 62.

The synthetic resin cover 63 is formed with a bottomed cylindrical configuration. Its cylindrical portion 63a is press-fit into the inner circumference of the inner-side end of the outer member 51. The lid (or bottom) portion 63b closes an opening of the outer member 51. The cylindrical portion 63a is formed with a flange 64 that abuts the end face of the outer member 51. Thus, it is possible to exactly position the whole cover 63 relative to the outer member 51 in the axial direction. Accordingly, it is possible to easily carry out the position control of the sensor 69 mounted on the cover 63.

Also as shown in FIG. 9, the lid portion 63b of the cover 63 is formed with a cylindrical sensor mounting portion 65. An insert portion 69a of a sensor 69 is inserted into a sensor mounting bore 66 formed in the inner circumferential side of the sensor mounting portion 65. A metal core 67, with a bottomed cylindrical configuration, is integrally molded with the cover 63 over a region from the inner circumference of the cylindrical portion 63a to the inner surface of the lid portion 63b. The metal core 67 has a cylindrical portion 67a integrally molded with the cylindrical portion 63a of the cover 63. A lid portion 67b forms a bottom of the cylindrical portion 67a and closes an opening of the sensor mounting bore 66 opposing the encoder body 62.

The metal core 67 is formed from non-magnetic steel sheet with a thickness of about 0.3 mm. The presence of the lid portion 67b increases the strength of the cover 63. The non-magnetic property of the metal core 67 does not provide negative influence to the accuracy of detecting the rotation speed.

The sensor 69 has an outer cover of synthetic resin and is mounted on the cover 63 by inserting the insert portion 69a into the sensor mounting bore 66 of the cover 63. The insert portion 69a opposes the encoder body 62 via a predetermined axial gap with the lid portion 67b of the metal core 67 sandwiched between. The insert portion 69a at a position near the opposing portion of the encoder body 62 includes a detecting portion (not shown) to detect change of the magnetic field generated by rotation of the magnetic encoder 60. This detecting portion can output electric signals of the sensor 69 via an output cable 68.

As described above, the opening portion of the sensor mounting bore 66 of the cover 63 opposing the encoder body 62 is perfectly closed by the lid portion 67b of the metal core 67 by the non-magnetic steel sheet. Thus, no foreign matter can enter into the inside of the wheel bearing apparatus. It has excellent sealability of the whole wheel bearing apparatus as compared with a sensor mounting bore of through-bore type which is not covered by any member (see Japanese Patent No. 4286063).

In such a wheel bearing apparatus incorporating a rotation speed detecting apparatus of the prior art, peeling (or separation) or small gaps tend to be caused by a difference of thermal expansion caused by the change of temperature due to thermal shock in the joined portions between the metal core 67 and the synthetic resin cover 63. The joined portions are between the cylindrical portions 67a of the metal core 67 and the cylindrical portion 63a of the cover 63 as well as between the lid portions 67b of the metal core 67 and the lid portion 63b of the cover 63. Thus, it is difficult to maintain the initial sealability for a long term. In addition, it is also difficult to firmly keep sealability if there is any chatter marks or scratches caused by cutting on the inner circumference of the end of the outer member 51 into which the cover 63 is press-fit.

SUMMARY

It is an object of the present disclosure to provide a wheel bearing apparatus incorporating a rotational speed detecting apparatus that can solve the above-described problems of the prior art. Thus, this improves the workability of assembly as well as the sealability of the wheel bearing apparatus.

To achieve the above mentioned object, a wheel bearing apparatus incorporating a rotation speed detecting apparatus comprises an outer member integrally formed on its outer circumference with a body mounting flange, to be mounted on a body of a vehicle. The outer member inner circumference includes double row outer raceway surfaces. An inner member includes a wheel hub and at least one inner ring. The wheel hub is integrally formed on one end with a wheel mounting flange. A cylindrical portion axially extends from the wheel mounting flange. The inner ring is press fit onto the cylindrical portion of the wheel hub. The inner member outer circumferences includes double row inner raceway surfaces opposing the double row outer raceway surfaces. Double row rolling elements are contained between the inner raceway surfaces and the outer raceway surfaces of the inner member and outer member. A pulser ring is adapted to be fit onto the outer circumference of the inner ring. The pulser ring has magnetic characteristics alternately and equidistantly varying along its circumferential direction. A cup-shaped sensor cap is secured on an inner-side end of the outer member. A rotation speed sensor, to detect the rotation speed of the wheel hub, is arranged at a position corresponding to the pulser ring via a predetermined axial air gap. The sensor cap is press-formed of anti-corrosion steel sheet into a cup-shaped configuration. The sensor cap has a cylindrical fitting portion to be press-fit into the end of the outer member. A bottom portion extends radially inward from the fitting portion to cover the inner-side end of the inner member. The rotation speed sensor is oppositely arranged so that it abuts or is positioned in close proximity to the bottom portion. Accordingly, the rotation speed sensor and pulser ring oppose one another with a predetermined axial air gap via the bottom portion. An elastic member is pressed and elastically deformed between the fitting portion of the sensor cap and the end of the outer member.

The wheel bearing apparatus incorporating a rotation speed detecting apparatus comprises a pulser ring adapted to be fit onto the outer circumference of the inner ring. The pulser ring has a magnetic characteristics alternately and equidistantly varying along its circumferential direction. A cup-shaped sensor cap is secured on an inner-side end of the outer member. A rotation speed sensor, to detect the rotation speed of the wheel hub, is arranged at a position corresponding to the pulser ring via a predetermined axial air gap. The sensor cap is press-formed of anti-corrosion steel sheet into a cup-shaped configuration. A cylindrical fitting portion is press-fit into the end of the outer member. A bottom portion extends radially inward from the fitting portion to cover the inner-side end of the inner member. The rotation speed sensor is arranged opposite so that it abuts or is positioned in close proximity to the bottom portion. Accordingly, the pulser ring and the rotation speed sensor oppose one another with a predetermined axial air gap via the bottom portion. An elastic member is pressed and elastically deformed between the fitting portion of the sensor cap and the end of the outer member. Thus, it is possible to prevent the deterioration of the sealability as in the prior art that would be caused by the generation of peeling or small gaps between the metal core and the cover due to a difference of thermal expansion due to a change of temperature caused by thermal shock. Thus, it is possible to provide a wheel bearing apparatus incorporating a rotation speed detecting apparatus that can improve the workability in assembly and keep the sealability of the wheel bearing.

A circular recess is press-formed in the bottom of the sensor cap substantially at its center. The rotation speed sensor can be secured on the sensor cap by fastening a securing bolt to a nut press-fit into the circular recess via a mounting flange of the rotation speed sensor. This makes it possible to smoothly secure the rotation speed sensor without generating a biased torque on the sensor cap during fastening of the securing bolt.

The sensor cap is formed from austenitic stainless steel. This improves the detecting accuracy without influencing the detecting performance of the rotation speed sensor.

The nut is formed from stainless steel. This prevents the generation of rust for a long term. Thus, this improves the durability of the wheel bearing apparatus.

A radially reduced portion is formed on the outer circumference of the inner-side end of the fitting portion of the sensor cap. The elastic member is integrally adhered to the outer circumference of the radially reduced portion via vulcanized adhesion. An annular projection projects radially outward and is formed on the elastic member. The annular projection is pressed onto the inner circumference of the inner-side end of the outer member when the sensor cap is press-fit. This further improves the sealability of the fitting portion of the sensor cap.

The elastic member is adhered to the outer circumference of the radially reduced portion so that it does not project from the inner-side surface of the bottom portion of the sensor cap. This makes it possible to obtain a stable detecting accuracy without interference of the elastic member with the rotation speed sensor.

An annular recess is formed on the inner circumference of the outer-side end of the fitting portion of the sensor cap. The elastic member is integrally adhered to the annular recess via vulcanized adhesion. An annular projection, projecting radially inward, is formed on the elastic member. The annular projection is pressed onto the outer circumference of the inner-side end of the outer member when the sensor cap is press-fit. This further improves the sealability of the fitting portion of the sensor cap.

A chamfered portion is formed on the inner-side end of the outer member. The elastic member is mounted in an annular space formed between the chamfered portion and corner portion between the fitting portion and the bottom portion of the sensor cap. The elastic member is elastically deformed into the annular space when the sensor cap is press-fit. This further improves the sealability of the fitting portion of the sensor cap.

The sensor cap is formed with a thinned wall portion on the radially outer side of the bottom portion of the sensor cap at a position corresponding to the pulser ring. The rotation speed sensor is oppositely arranged so that it abuts or is positioned in close proximity to the thinned wall portion. This enables the air gap to be set small and thus to have a further high detecting accuracy.

The thinned wall portion is formed in accordance with the configuration of the rotation speed sensor. This makes it possible to easily perform the circumferential positioning of the rotation speed sensor. This improves the workability of assembly.

The thickness of the thinned wall portion of the sensor cap is 0.2~0.5 times the thickness of the bottom portion. It is set within a range of 0.1~0.5 mm. This makes it possible to keep sufficient strength, rigidity and desirable magnetic flux density and thus improve the detecting accuracy.

The amplitude of chatter marks formed by cutting on a fitting surface of the outer member where the sensor cap is fit is limited to 3 μm or less. This makes it possible to further improve the sealability of the fitting portion between the outer member and the sensor cap.

The rotation speed sensor is arranged horizontal relative to the road surface. This suppresses air gap variation between the rotation speed sensor and the magnetic encoder. Thus, this enables a stable detecting accuracy even under a condition where the outer member and the inner member are relatively inclined to each other by a lateral load from a wheel.

The pitch circle diameter of the outer-side row of rolling elements of the double row rolling elements is set larger than the pitch circle diameter of the inner-side row of rolling elements. The diameter of each rolling element of the outer-side row is set smaller than the diameter of each rolling element of the inner-side row. The number of the outer-side row of rolling elements is set larger than the number of the inner-side row of rolling elements. This makes it possible to increase the bearing rigidity of the outer-side row than that of the inner-side row. Thus, this extends the life of bearing and additionally increases the rigidity of the bearing while suppressing the radial dimension of the outer-side portion of the outer member.

The wheel bearing apparatus incorporating with a rotation speed detecting apparatus of the present disclosure comprises an outer member integrally formed on its outer circumference with a body mounting flange to be mounted on a body of a vehicle. The outer member inner circumference includes double row outer raceway surfaces. An inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The outer circumference of the inner member is formed with double row inner raceway surfaces opposing the double row outer raceway surfaces. Double row rolling elements are contained between the inner raceway surfaces and outer raceway surfaces of the inner member and outer member. A pulser ring is adapted to be fit onto the outer circumference of the inner ring. The pulser ring has a magnetic characteristics alternately and equidistantly varying along its circumferential direction. A cup-shaped sensor cap is secured on an inner-side end of the outer member. A rotation speed sensor, to detect the rotation speed of the wheel hub, is arranged at a position corresponding to the pulser ring, via a predetermined axial air gap. The sensor cap is press-formed of anti-corrosion steel sheet into a cup-shaped configuration and includes a cylindrical fitting portion to be press-fit into the end of the outer member. A bottom portion extends radially inward from the fitting portion to cover the inner-side end of the inner member. The rotation speed sensor is oppositely arranged so that it abuts or is positioned in close proximity to the bottom portion. Accordingly, the pulser ring and the rotation speed sensor oppose one another with a predetermined axial air gap, via the bottom portion. An elastic member is pressed and elastically deformed between the fitting portion of the sensor cap and the end of the outer member. Thus, it is possible to prevent deterioration of the sealability that would be caused by the generation of peeling or small gaps between the metal core and the cover due to a difference of thermal expansion, due to change of temperature caused by thermal shock. Thus, it is possible to provide a wheel bearing apparatus incorporating a rotation speed detecting apparatus that can improve the workability during assembly and keep the sealability of the wheel bearing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Hereinafter, an embodiment of the present disclosure will be specifically described with reference to the drawings.

One mode for carrying out the disclosure is a wheel bearing apparatus incorporating a rotation speed detecting apparatus comprising an outer member integrally formed on its outer circumference with a body mounting flange, to be mounted on a body of a vehicle. The outer member inner circumference includes double row outer raceway surfaces. An inner member includes a wheel hub and an inner ring. The wheel hub is integrally formed on its one end with a wheel mounting flange. The inner member outer circumference has an inner raceway surface opposing one of the double row outer raceway surface. A cylindrical portion axially extends from the inner raceway surface. The inner ring is press fit onto the cylindrical portion of the wheel hub. The inner ring outer circumference has an inner raceway surface opposing the other of the double row outer raceway surface. Double row rolling elements are contained between the inner raceway surfaces and outer raceway surfaces of the inner member and outer member. A magnetic encoder has a magnetic characteristics alternately and equidistantly varying along its circumferential direction. A cup-shaped sensor cap is secured on an inner-side end of the outer member. A rotation speed sensor is arranged at a position corresponding to the magnetic encoder, via a predetermined axial air gap. The sensor cap is press-formed from a stainless steel sheet into a cup-shaped configuration with a cylindrical fitting portion, to be press-fit into the end of the outer member, and a bottom portion, extending radially inward from the fitting portion via a radially reduced portion, to cover the inner-side end of the inner member. The rotation speed sensor is oppositely arranged so that it abuts or is positioned in close proximity to the bottom portion. Accordingly, the pulser ring and the rotation speed sensor oppose one another with a predetermined axial air gap, via the bottom portion. An elastic member is integrally adhered to the outer circumference of the radially reduced portion of the sensor cap. The elastic member is pressed and elastically deformed onto the inner circumference of the end of the outer member.

A preferred embodiments of the disclosure will be described with reference to the accompanied drawings.

Figure 1:
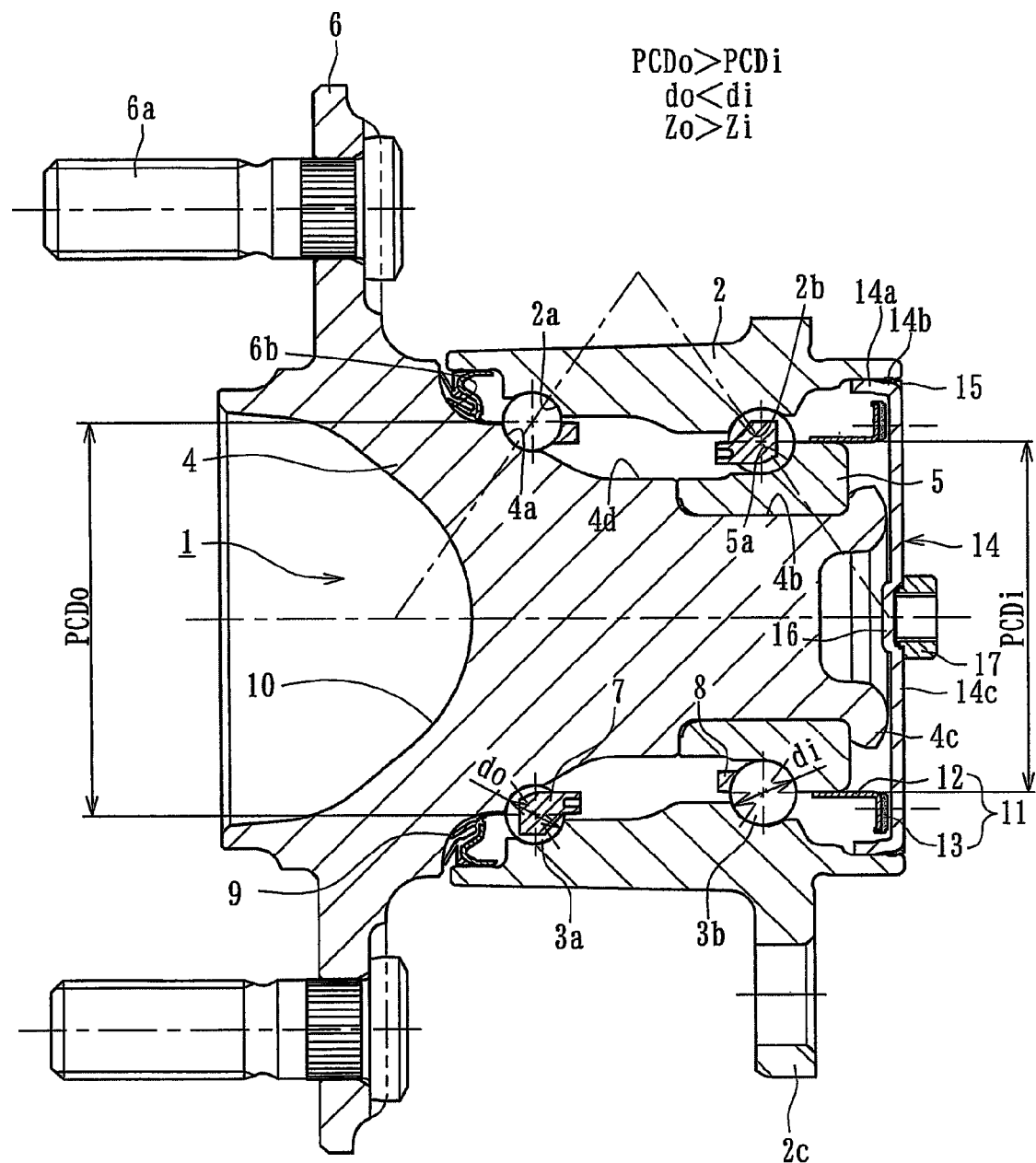
FIG. 1 is a longitudinal section view of a first embodiment of a wheel bearing apparatus incorporating a rotation speed detecting apparatus.
Figure 2:
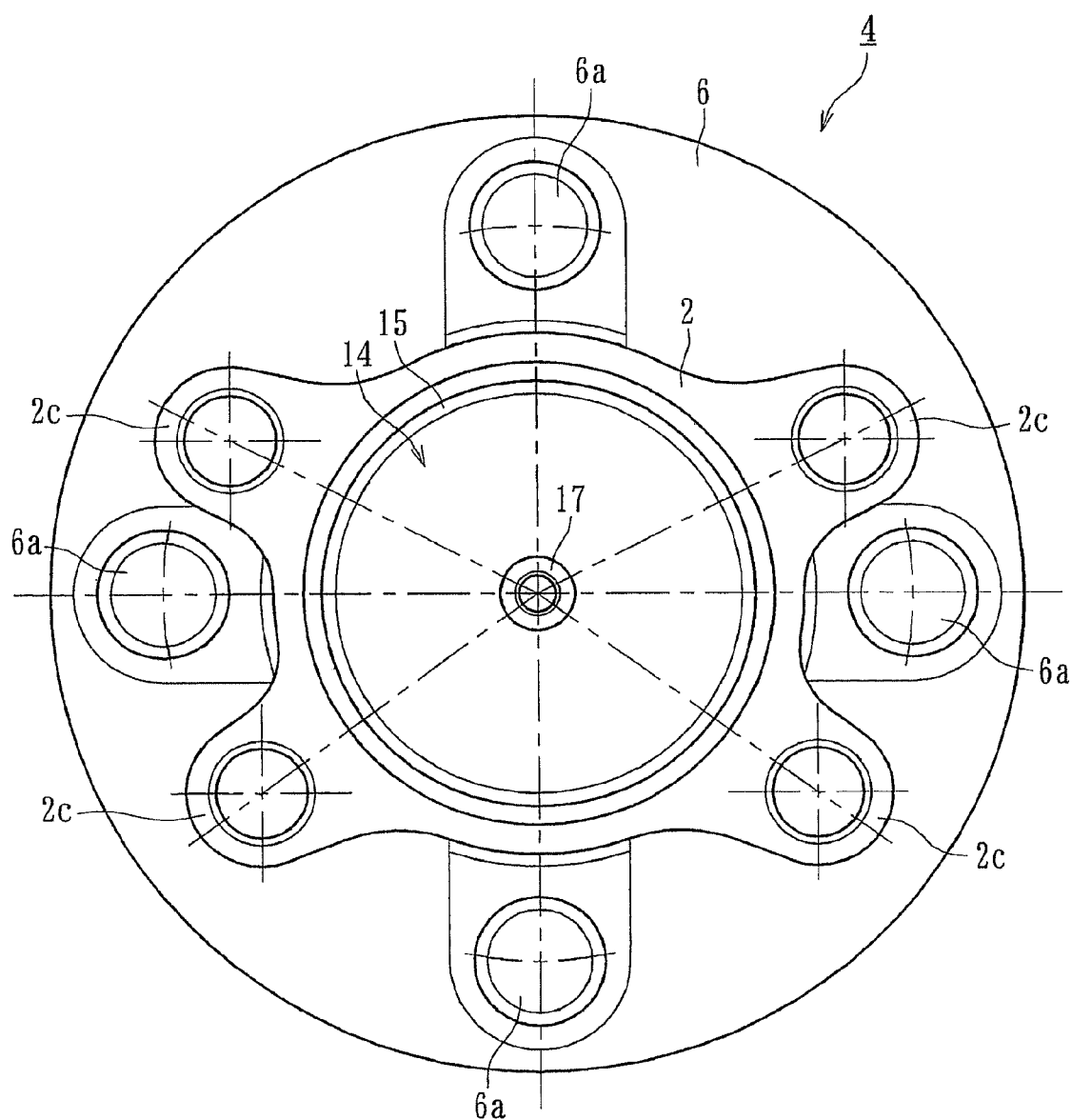
FIG. 2 is a side elevation view of FIG. 1.
Figure 3:
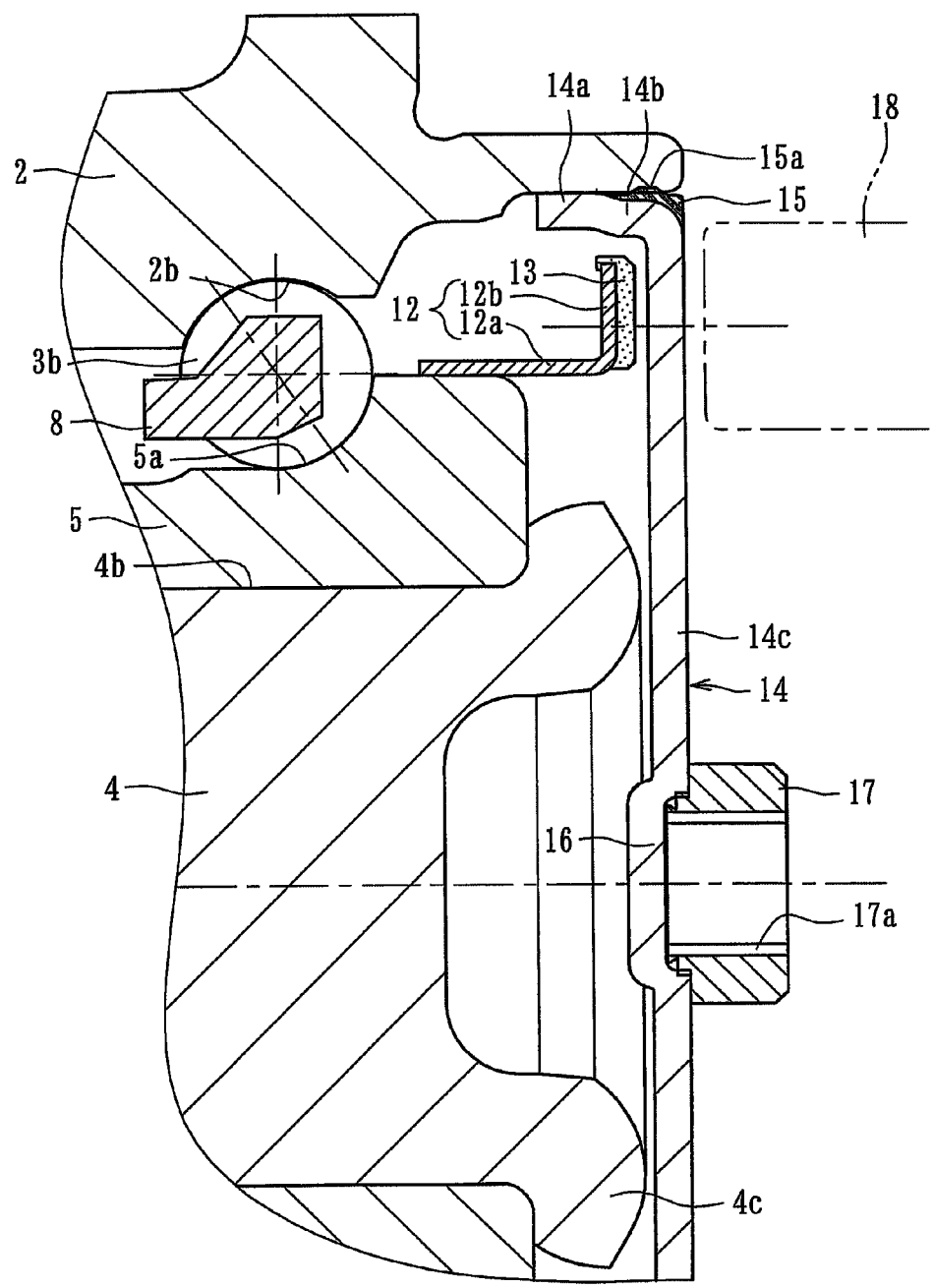
FIG. 3 is a partially enlarged view of FIG. 1.

FIG. 1 is a longitudinal-section view of a first embodiment of a wheel bearing apparatus incorporating a rotation speed detecting apparatus. FIG. 2 is a side elevation view of FIG. 1. FIG. 3 is a partially enlarged view of FIG. 1. In the description below, an outer-side of a bearing apparatus is referred to as "outer-side" (the left in FIG. 1), and an inner-side of a bearing apparatus is referred to as "inner side" (the right in FIG. 1) when it is mounted on a vehicle.

The wheel bearing apparatus incorporating a rotation speed detecting apparatus of FIG. 1 is a so-called "third generation" type for a driven wheel. The wheel bearing apparatus includes an inner member 1, an outer member 2, and double row rolling elements (balls) 3a, 3b contained between the inner and outer members 1 and 2. The inner member 1 includes a wheel hub 4 and an inner ring 5 press-fit onto the wheel hub 4 via a predetermined interference.

The wheel hub 4 is integrally formed on its outer-side end with a wheel mount flange 6 for mounting a wheel (not shown). The wheel hub outer circumference includes one (outer-side) inner raceway surface 4a. A cylindrical portion 4b axially extends, via a shaft shaped portion 4d, from the inner raceway surface 4a. The wheel mount flange 6 has hub bolts 6a at its circumferentially equidistant positions.

An axially extending cup-shaped recess 10 is formed on the outer-side end of the wheel hub 4. This recess 10 is formed by forging and extends into a position near the bottom of the outer-side inner raceway surface 4a. Thus, a wall thickness of the outer-side portion of the wheel hub 4 is substantially uniform.

The inner ring 5 is formed on its outer circumference with the other (inner-side) inner raceway surface 5a. The ring 5 is press-fit onto the cylindrical portion 4b of the wheel hub 4 to form a double row angular contact ball bearing of the back-to-back duplex type. The ring 5 is axially secured on the wheel hub 4, applying a predetermined bearing pre-pressure, by a caulked portion 4c. The caulked portion 4c is formed by plastically deforming the end of the cylindrical portion 4b radially outward. This makes it possible to reduce the weight and size of the wheel bearing apparatus and have a desirable bearing life. The inner ring 5 and rolling elements 3a, 3b are formed from high carbon chrome steel such as SUJ2. They are dip hardened to their cores to have a hardness of 58~64 HRC.

The wheel hub 4 is made of medium-high carbon steel such as S53C including carbon of 0.40~0.80% by weight. It is hardened by high frequency induction hardening to have a surface hardness of 58~64 HRC over the inner raceway surface 4a and a region from an inner-side base 6b of the wheel mounting flange 6 to the cylindrical portion 4b. The caulked portion 4c is not hardened and kept at a hardness after forging. This enables a sufficient mechanical strength to be applied to the wheel mounting flange 6 against the rotary bending and to improve the anti-fretting strength of the cylindrical portion 4b fit by the inner ring 5 as well as to carry out smooth plastic machining of the caulking portion 4c without generating any micro-crack.

The outer member 2 outer circumference includes a body mount flange 2c adapted to be mounted on a knuckle (not shown). The outer member inner circumference includes an outer-side outer raceway surface 2a opposing the inner raceway surface 4a of the wheel hub 4 and an inner-side outer raceway surface 2b opposing the inner raceway surface 5a of the inner ring 5. Double row rolling elements 3a, 3b are contained between the outer and inner raceway surfaces and are rollably held by cages 7, 8. A seal 9 is mounted on the outer-side opening formed between the outer member 2 and the inner member 1. A sensor cap 14, described below, is mounted on the inner-side opening in order to prevent leakage of lubricating grease sealed within the bearing and the entry of rain water or dust from the outside into the bearing.

The outer member 2 is formed of medium-high carbon steel such as S53C including carbon of 0.40~0.80% by weight. The double row outer raceway surfaces 2a, 2b are hardened by high frequency induction hardening to have a surface hardness of 58~64 HRC. Although it is shown herein as a double row angular contact ball bearing, using balls as rolling elements 3a, 3b, the present disclosure is not limited to such a bearing and may be applied to a double row tapered roller bearing using tapered rollers as rolling elements.

In this embodiment, the pitch circle diameter PCDo of the outer-side row of rolling elements 3a is set larger than the pitch circle diameter PCDi of the inner-side rolling elements 3b (PCDo>PCDi). The diameter (do) of each rolling element 3a of the outer-side row is set smaller than the diameter (di) of each rolling element 3b of the inner-side row (do<di). Due to these differences between the pitch circle diameters PCDo and PCDi and between the diameters (do) and (di), the number Zo of the outer-side row of rolling elements 3a is larger than the number Zi of the inner-side row of rolling elements 3b (Zo>Zi). This makes it possible to increase the bearing rigidity of the outer-side as compared with that of the inner-side. Thus, this extends the life of the bearing. Although it is shown as a wheel bearing where different sizes of rolling elements 3a, 3b are used, it will be understood that same size of rolling elements can be used in both rows.

A pulser ring 11 is press-fit onto the outer circumference of the inner ring 5. The pulser ring 11 includes an annular supporting member 12 and a magnetic encoder 13 adhered to the side of the annular supporting member 12. The magnetic encoder 13 is formed of elastomer such as rubber where ferritic magnetic powder is mingled so that N and S poles are alternately arranged along its circumference.

The annular supporting member 12 is formed from a ferromagnetic steel plate such as ferritic stainless steel sheet (JIS SUS 430 etc.) or preserved cold rolled steel sheet (JIS SPCC etc.) by press working. The annular supporting member 12 has a substantially L-shaped cross-section. As shown in FIG. 3, it includes a cylindrical portion 12a, press-fit onto the inner ring 5, and a standing-up portion 12b, extending radially outward from the cylindrical portion 12a. The magnetic encoder 13 is adhered to the inner-side surface of the standing-up portion 12b.

The sensor cap 14 is fit into the inner-side end portion of the outer member 2 to close off an opening. The sensor cap 14 is press-formed from a stainless steel sheet to have a cup-shaped configuration. The cap 14 includes a cylindrical fitting portion 14a, to be press-fit into the end of the outer member 2, and a bottom portion 14c, extending radially inward from the fitting portion 14a via a radially reduced portion 14b, to cover the inner-side end of the inner member 1. The sensor cap 14 is formed of non-magnetic steel sheet e.g. austenitic stainless steel sheet (JIS SUS 304 etc.) not so as to give an adverse effect on the detecting performance of a rotation speed sensor described below.

In this embodiment, an elastic member 15, formed of synthetic rubber such as NBR (acrylonitrile-butadiene rubber), is integrally adhered to the outer circumference of the radially reduced portion 14b, via vulcanized adhesion. The elastic member 15 is adhered to the outer circumference of the radially reduced portion 14b so that it does not project from the inner-side surface of the bottom portion 14c of the sensor cap 14. This prevents the elastic member 15 from interfering with the rotation speed sensor 18. In addition, the elastic member 15 has an annular projection 15a projecting radially outward beyond the outer diameter of the fitting portion 14a of the sensor cap 14. The annular projection 15a is pressed into the inner circumference of the inner-side end of the outer member 2 when the sensor cap 14 is press-fit. This improves the sealability of the fitting portion 14a. An amplitude of chatter marks formed by cutting on a fitting surface of the outer member 2, to which the sensor cap 14 is fit, is limited to 3 μm or less.

In this embodiment, a circular recess 16 is press-formed in the bottom 14c of the sensor cap 14 substantially at its center. A nut 17 is press-fit into the circular recess 16 (see FIG. 2). The rotation speed sensor 18 can be secured to the sensor cap 14 by fastening a securing bolt to an internal thread 17a of the nut 17, via a mounting flange (not shown) of the rotation speed sensor 18. This makes it possible to smoothly secure the rotation speed sensor 18 without generating a biased torque on the sensor cap 14 during fastening of the securing bolt. The nut 17 is formed from preserved steel such as austenitic stainless steel or ferritic stainless steel. This prevents the generation of rust for a long term and improves the durability of the wheel bearing apparatus.

The rotation speed sensor 18 is oppositely arranged so that it abuts or is positioned in close proximity to the bottom portion 14c. It is positioned radially outward of the bottom portion 14c of the sensor cap 14 and corresponds to the magnetic encoder 13. The rotation speed sensor 18 detects the rotation speed of a wheel by detecting difference in magnetic flux of the magnetic encoder 13 via the bottom portion 14c. Thus, it is possible to obtain a desirable air gap and to improve the workability during assembly without a complicated air gap adjustment. In addition, since the detecting portion is closed by the sensor cap 14, it is possible to prevent deterioration of the sealability as in the prior art which would be caused by the generation of peeling or small gaps between the metal core and the cover due to a difference of thermal expansion due to a change of temperature caused by thermal shock. Thus, it is possible to provide a wheel bearing apparatus incorporating a rotation speed detecting apparatus that can improve the workability in assembly and keep the sealability of the wheel bearing.

The rotation speed sensor 18 includes an IC incorporating with a Hall element, a magnetic resistance element (MR element) etc., and a waveform shaping circuit to shape the output waveform of the magnetic detecting element and forms the ABS of an automobile to detect the rotation speed of a wheel and control it.

Figure 4:
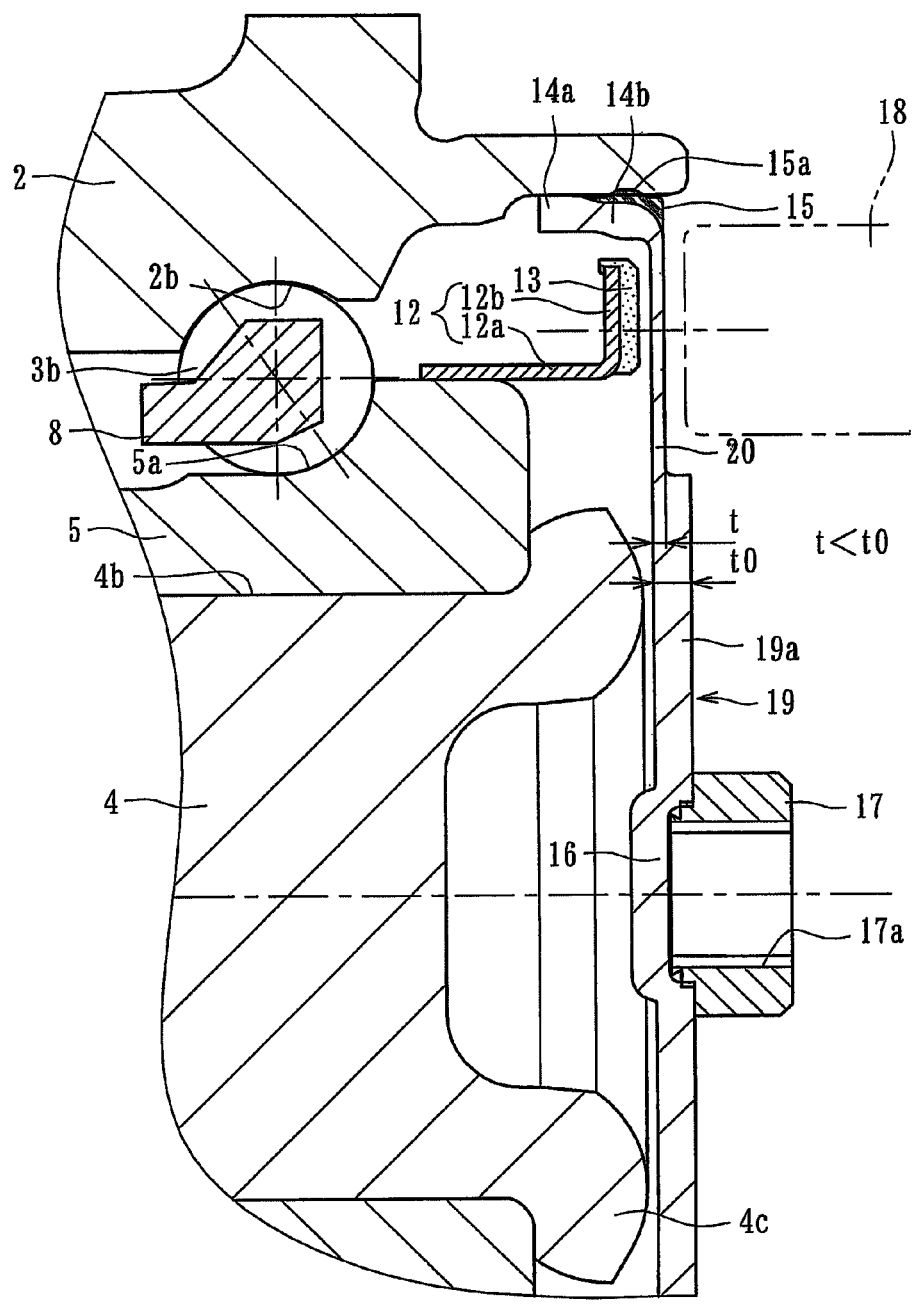
FIG. 4 is a partially enlarged view of a second embodiment of a wheel bearing apparatus incorporating a rotation speed detecting apparatus.

FIG. 4 is a partially enlarged view of a second embodiment of a wheel bearing apparatus incorporating a rotation speed detecting apparatus. Since this embodiment is basically different from the first embodiment (FIG. 3) only in a structure of the sensor cap, the same reference numerals as those used in the previous embodiment are used to designate the same structural elements and its detailed description will be omitted.

The sensor cap 19 is press-formed from stainless steel sheet having anti-corrosion property into a cup-shaped configuration. The cap 19 includes a cylindrical fitting portion 14a, to be press-fit into the end of the outer member 2, and a bottom portion 19a extending radially inward from the fitting portion 14a, via a radially reduced portion 14b. It is preferable to form the sensor cap 19 by using non-magnetic steel sheet such as austenitic stainless steel sheet.

The sensor cap 19 is formed with a thinned wall portion 20 on the radially outer side of the bottom portion 19a at a position corresponding to the magnetic encoder. The rotation speed sensor 18 is oppositely arranged so that it abuts is or positioned in close proximity to the thinned wall portion 20. This enables setting of a substantially small air gap and thus a further high detecting accuracy. In addition, it is possible to easily perform the circumferential positioning of the rotation speed sensor 18. Thus, this improves the workability during assembly.

The thickness "t" of the thinned wall portion 20 of the sensor cap 19 is 0.2~0.5 times the thickness "t0" of the bottom portion 19a. It is set within a range of 0.1~0.5 mm. It is believed that the strength and rigidity of the sensor cap 19 will be insufficient and thus be deformed or broken due to impingement against any other parts during its assembly if the thickness "t" is less than 0.1 mm. Also, it is believed that the air gap will be too large to obtain necessary magnetic flux density if the thickness "t" exceeds 0.5 mm.

Figure 5:
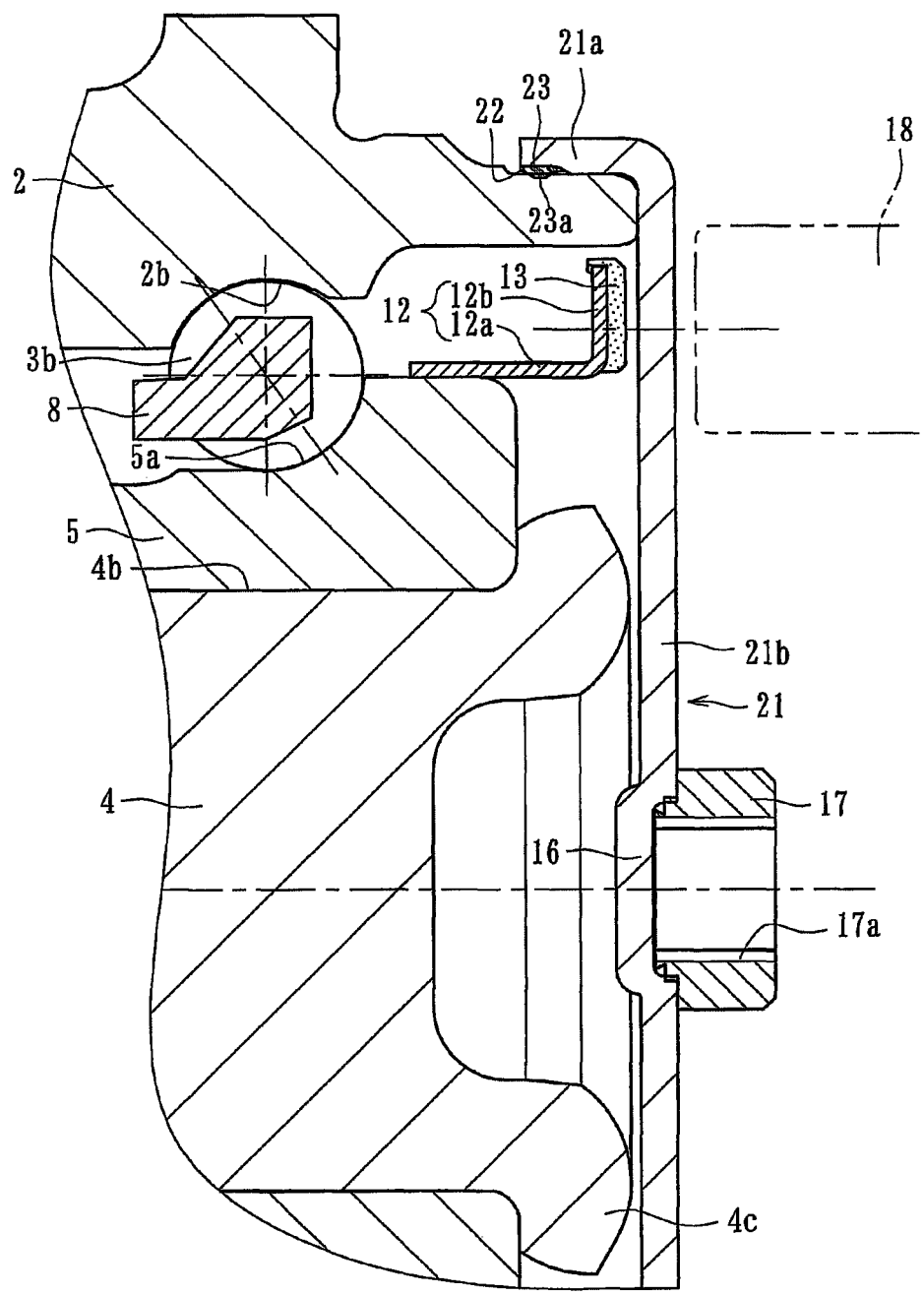
FIG. 5 is a partially enlarged view of a third embodiment of a wheel bearing apparatus incorporating a rotation speed detecting apparatus.

FIG. 5 is a partially enlarged view of a third embodiment of a wheel bearing apparatus incorporating a rotation speed detecting apparatus. Since this embodiment is basically different from the first embodiment (FIG. 3) only in a structure of the sensor cap, the same reference numerals as those used in the previous embodiment are used to designate the same structural element and its detailed description will be omitted.

The sensor cap 21 is press-formed from stainless steel sheet with anti-corrosion property into a cup-shaped configuration with a cylindrical fitting portion 21a, to be press-fit onto the end of the outer member 2, and a bottom portion 21b, extending radially inward from the fitting portion 21a. It is preferable to form the sensor cap 21 by using non-magnetic steel sheet such as austenitic stainless steel sheet.

An annular recess 22 is formed on the inner circumference of the outer-side end of the fitting portion 21a of the sensor cap 21. An elastic member 23 is integrally adhered to the annular recess 22 via vulcanized adhesion. An annular projection 23a, projecting radially inward, is formed on the elastic member 23. The annular projection 23a is pressed onto the outer circumference of the inner-side end of the outer member 2 when the sensor cap 21 is press-fit. The amplitude of chatter marks formed by cutting on a fitting surface of the outer member 2 where the sensor cap 21 is fit is limited to 3 μm or less. Thus, this improves the sealability of the fitting portion 21a.

Figure 6:
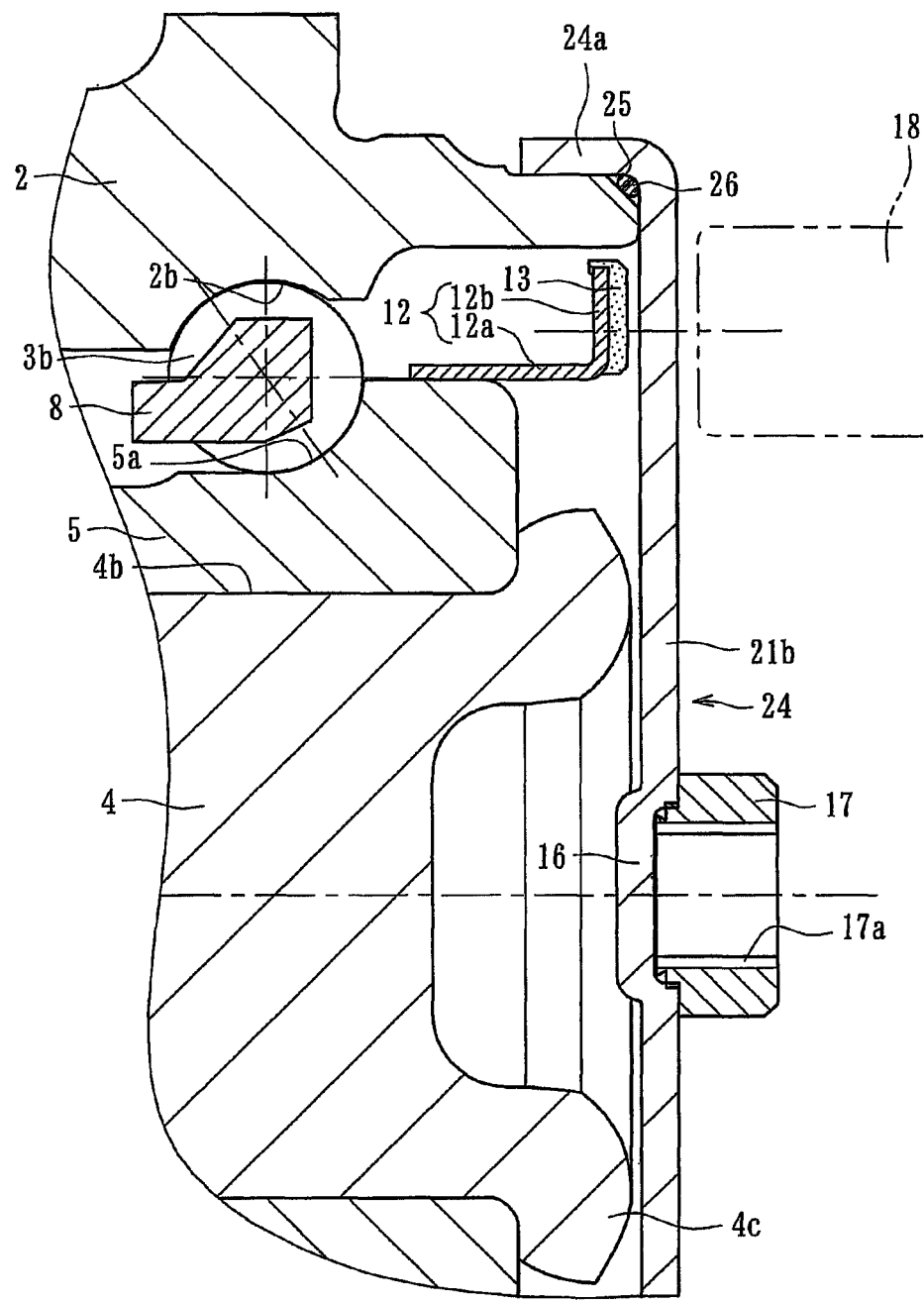
FIG. 6 is a partially enlarged view of a fourth embodiment of a wheel bearing apparatus incorporating a rotation speed detecting apparatus.
Figure 7:
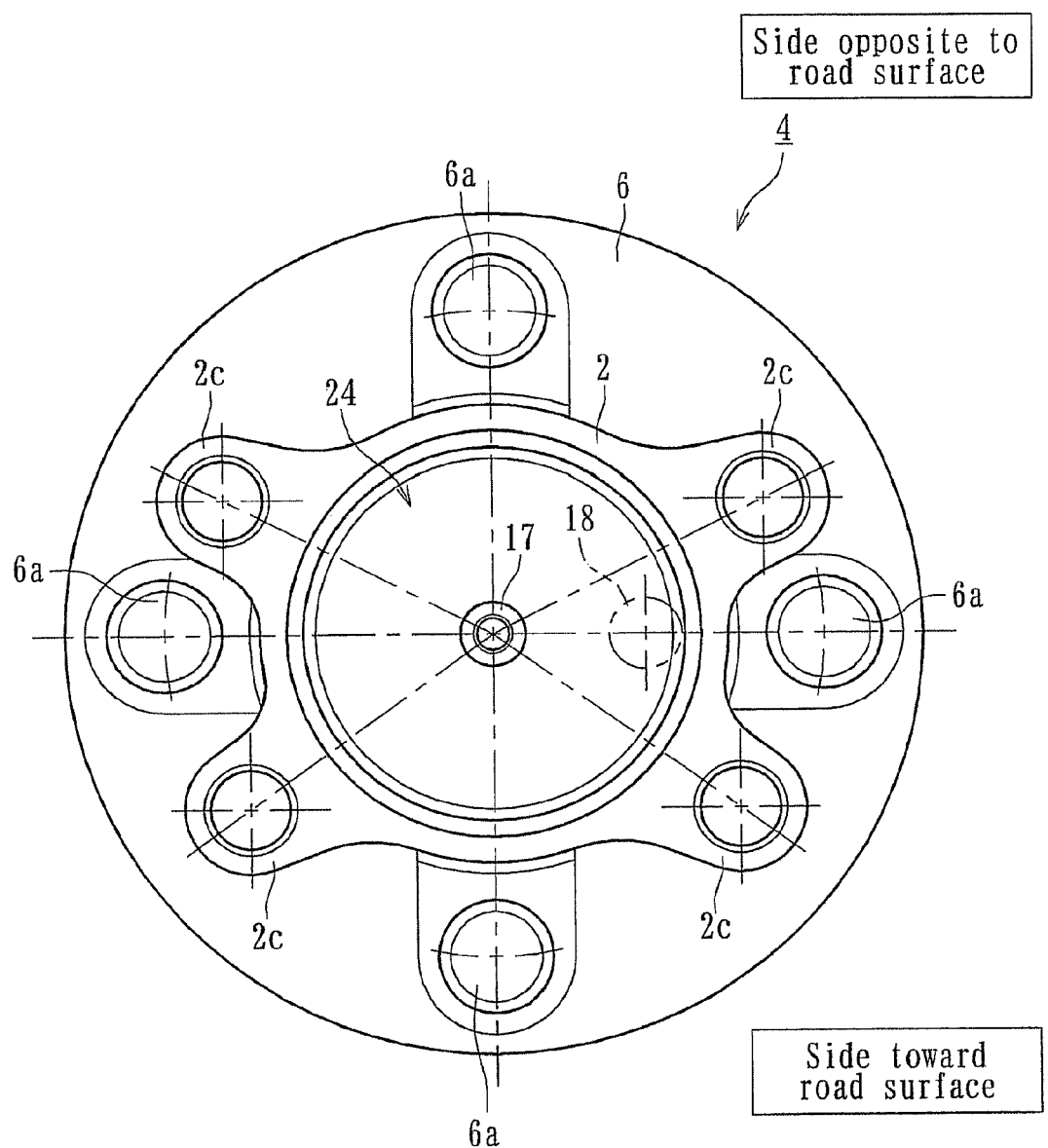
FIG. 7 is a side elevation view of a wheel bearing apparatus incorporating a rotation speed detecting apparatus mounted on a vehicle.
Figure 8:
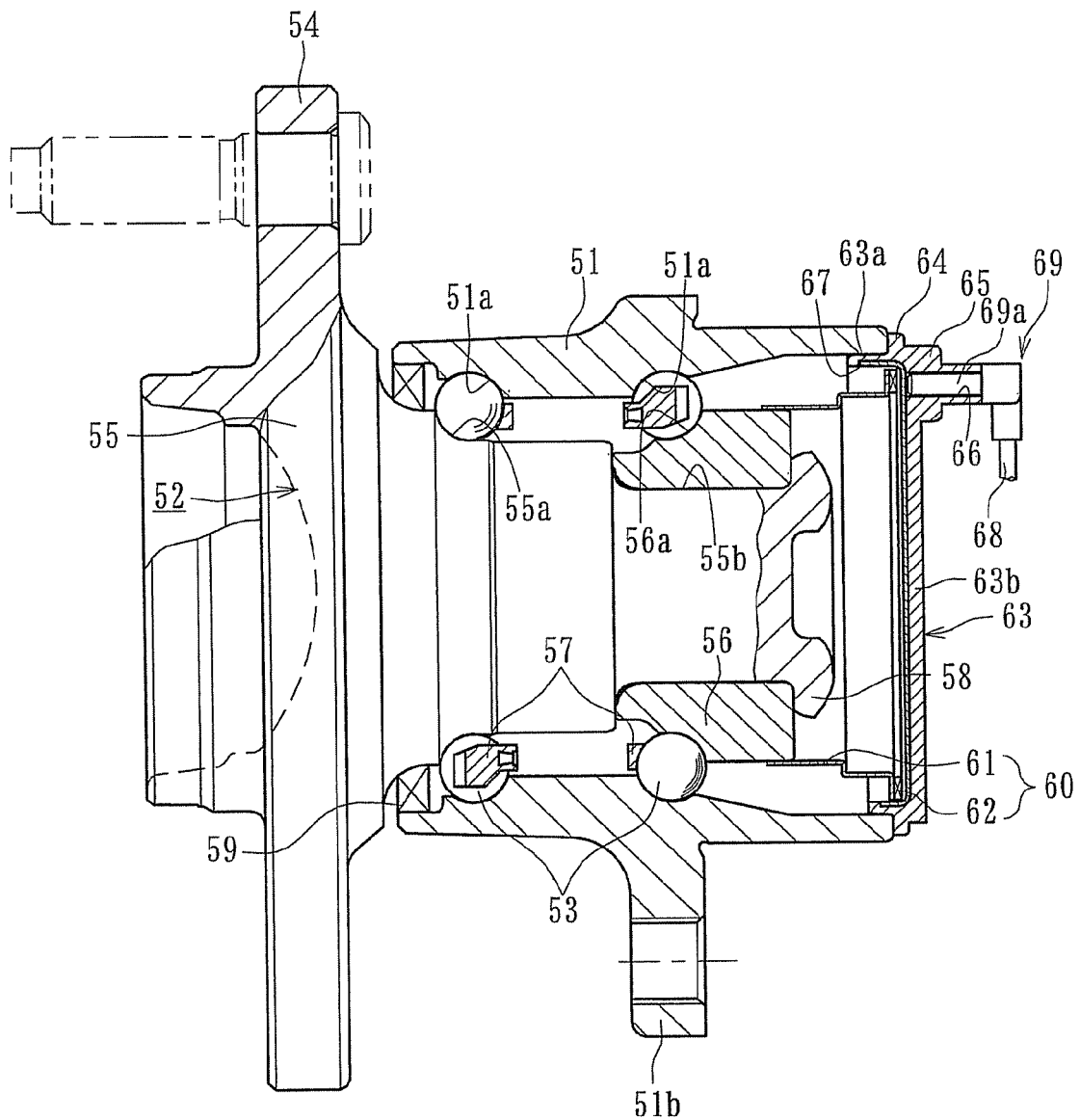
FIG. 8 is a longitudinal section view of a prior art wheel bearing apparatus incorporating a rotation speed detecting apparatus.
Figure 9:
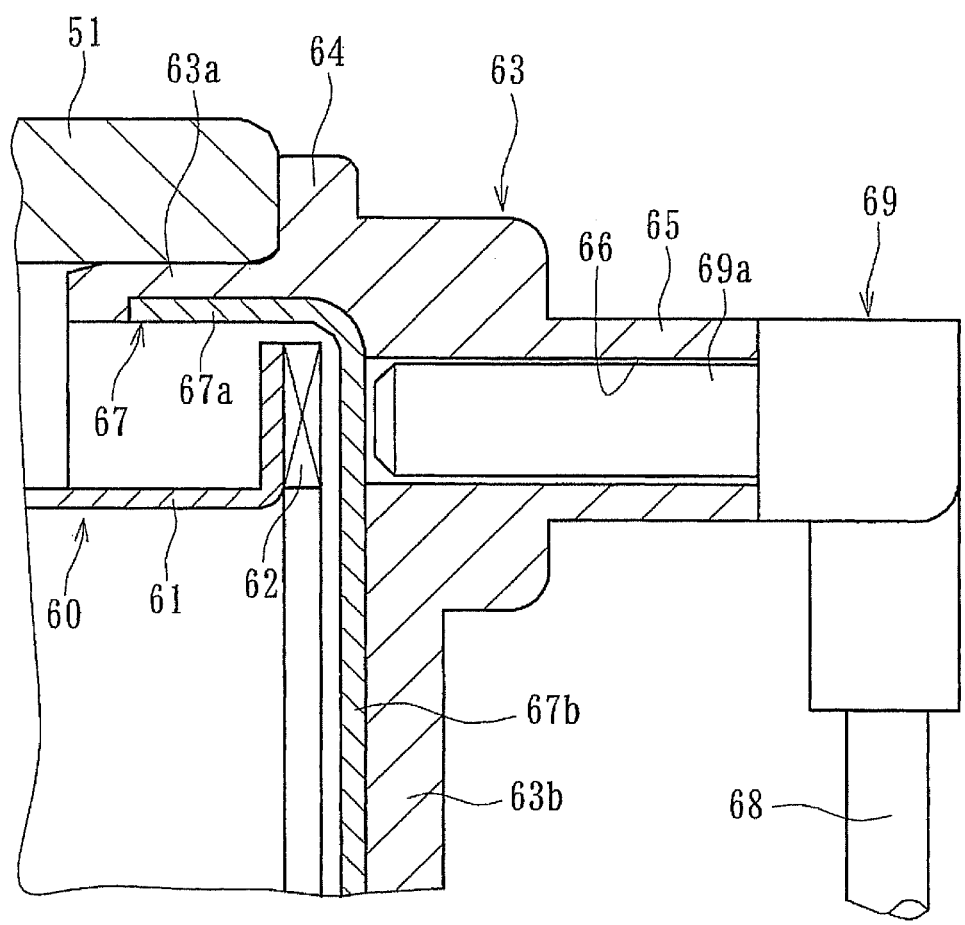
FIG. 9 is a partially enlarged view of FIG. 8.

FIG. 6 is a partially enlarged view of a fourth embodiment of a wheel bearing apparatus incorporating a rotation speed detecting apparatus. FIG. 7 is a side elevation view of a wheel bearing apparatus of FIG. 6 mounted on a vehicle. Since this embodiment is basically different from the third embodiment (FIG. 5) only in a structure of the sensor cap, the same reference numerals as those used in the previous embodiment are used to designate the same structural element and its detailed description will be omitted.

The sensor cap 24 is press-formed from stainless steel sheet with anti-corrosion properties into a cup-shaped configuration with a cylindrical fitting portion 24a, to be press-fit onto the end of the outer member 2, and a bottom portion 21b, extending radially inward from the fitting portion 24a. It is preferable to form the sensor cap 24 by using non-magnetic steel sheet such as austenitic stainless steel sheet.

The amplitude of chatter marks formed by cutting on a fitting surface of the outer circumference of the inner-side end of the outer member 2 where the sensor cap 24 is fit is limited to 3 μm or less. A chamfered portion 25 is formed on the inner-side end of the outer member 2. The elastic member 26 of synthetic resin such as NBR is mounted in an annular space formed between the chamfered portion 25 and a corner portion between the fitting portion 24a and the bottom portion 21b of the sensor cap 24. The elastic member 26 is elastically deformed in the annular space when the sensor cap 24 is press-fit. This improves the sealability of the fitting portion 24a of the sensor cap 24.

The rotation speed sensor 18 is arranged horizontal relative to the road surface under a condition mounted on a vehicle, as shown in FIG. 7. This makes it possible to suppress air gap variation between the rotation speed sensor 18 and the magnetic encoder. Thus, it has a stable detecting accuracy even under a condition where the outer member 2 and the wheel hub 4 (inner member) are relatively inclined to each other by a lateral load from a wheel.

The present disclosure can be applied to any type of wheel bearing apparatus of an inner ring rotation type for a driven wheel using balls or tapered rollers as rolling elements.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus incorporating a rotation speed detecting apparatus comprising:
an outer member integrally formed with a body mounting flange on its outer circumference, the body mounting flange is to be mounted on a body of a vehicle, the outer member inner circumference includes double row outer raceway surfaces;
an inner member includes a wheel hub and at least one inner ring, the wheel hub is integrally formed on its one end with a wheel mounting flange, a cylindrical portion axially extends from the wheel mounting flange, the inner ring is press fit onto the cylindrical portion of the wheel hub, the inner member outer circumferences includes double row inner raceway surfaces opposing the double row outer raceway surfaces;
double row rolling elements are contained between the inner raceway surfaces and outer raceway surfaces of the inner member and outer member;
a pulser ring is adapted to be fit onto the outer circumference of the inner ring, the pulser ring has magnetic characteristics alternately and equidistantly varying along its circumferential direction;
a cup-shaped sensor cap is secured on an inner-side end of the outer member;
a rotation speed sensor, to detect the rotation speed of the wheel hub, is arranged at a position corresponding to the pulser ring via a predetermined axial air gap;
the sensor cap is press-formed of anti-corrosion steel sheet into a cup-shaped configuration with a cylindrical fitting portion, to be press-fit with the inner side end of the outer member, and a bottom portion, extending radially inward from the fitting portion, to cover the inner-side end of the inner member;
a fastener secured with the bottom portion of the sensor cap, the fastener fastening with the rotation speed sensor for securing the rotation speed sensor with the sensor cap;
the rotation speed sensor is oppositely arranged so that it abuts or is positioned in close proximity to the bottom portion, and the rotation speed sensor and pulser ring are opposed with a predetermined axial air gap via the bottom portion; and
an elastic member is pressed and elastically deformed between the fitting portion of the sensor cap and the end of the outer member.

2. The wheel bearing apparatus incorporating a rotation speed detecting apparatus of claim 1 wherein a circular recess is press-formed into the bottom of the sensor cap substantially at its center, and the rotation speed sensor can be secured on the sensor cap by fastening a securing bolt to a nut press-fit into the circular recess via a mounting flange of the rotation speed sensor.

3. The wheel bearing apparatus incorporating a rotation speed detecting apparatus of claim 1 wherein the sensor cap is formed of austenitic stainless steel.

4. The wheel bearing apparatus incorporating a rotation speed detecting apparatus of claim 1 wherein the fastener is formed from stainless steel.

5. The wheel bearing apparatus incorporating with a rotation speed detecting apparatus of claim 1 wherein a radially reduced portion is formed on the outer circumference of the inner-side end of the fitting portion of the sensor cap and the elastic member is integrally adhered to the outer circumference of the radially reduced portion via vulcanized adhesion, and an annular projection, projecting radially outward, is formed on the elastic member and the annular projection is pressed into the inner circumference of the inner-side end of the outer member when the sensor cap is press-fit.

6. The wheel bearing apparatus incorporating a rotation speed detecting apparatus of claim 5 wherein the elastic member is adhered to the outer circumference of the radially reduced portion so that it does not project from the inner-side surface of the bottom portion of the sensor cap.

7. The wheel bearing apparatus incorporating a rotation speed detecting apparatus of claim 1 wherein an annular recess is formed on the inner circumference of the outer-side end of the fitting portion of the sensor cap and the elastic member is integrally adhered to the annular recess via vulcanized adhesion, and an annular projection, projecting radially inward, is formed on the elastic member and the annular projection is pressed onto the outer circumference of the inner-side end of the outer member when the sensor cap is press-fit.

8. The wheel bearing apparatus incorporating with a rotation speed detecting apparatus of claim 1 wherein a chamfered portion is formed on the inner-side end of the outer member and the elastic member is mounted in an annular space formed between the chamfered portion and a corner portion between the fitting portion and the bottom portion of the sensor cap with the elastic member being elastically deformed in the annular space when the sensor cap is press-fit.

9. The wheel bearing apparatus incorporating with a rotation speed detecting apparatus of claim 1 wherein the sensor cap is formed with a thinned wall portion on the radially outer side of the bottom portion of the sensor cap at a position corresponding to the pulser ring, and the rotation speed sensor is oppositely arranged so that it abuts or is positioned in close proximity to the thinned wall portion.

10. The wheel bearing apparatus incorporating a rotation speed detecting apparatus of claim 9 wherein a thickness (t) of the thinned wall portion of the sensor cap is 0.2~0.5 times a thickness (t0) of the bottom portion and is set within a range of 0.1~0.5 mm.

11. The wheel bearing apparatus incorporating a rotation speed detecting apparatus of claim 1 wherein the amplitude of chatter marks formed by cutting on a fitting surface of the outer member with the sensor cap is fitted is limited to 3 μm or less.

12. The wheel bearing apparatus incorporating a rotation speed detecting apparatus of claim 1 wherein the rotation speed sensor is arranged horizontal relative to the road surface.

13. The wheel bearing apparatus incorporating a rotation speed detecting apparatus of claim 1 wherein a pitch circle diameter of the outer-side row of rolling elements of the double row rolling elements is set larger than a pitch circle diameter of the inner-side row of rolling elements, the diameter of each rolling element of the outer-side row is set smaller than a diameter of each rolling element of the inner-side row, and wherein a number of the outer-side row of rolling elements is set larger than the number of the inner-side row of rolling elements.

14. A wheel bearing apparatus incorporating a rotation speed detecting apparatus comprising:

an outer member integrally formed with a body mounting flange on its outer circumference, the body mounting flange is to be mounted on a body of a vehicle, the outer member inner circumference includes double row outer raceway surfaces;

an inner member includes a wheel hub and at least one inner ring, the wheel hub is integrally formed on its one end with a wheel mounting flange, a cylindrical portion axially extends from the wheel mounting flange, the inner ring is press fit onto the cylindrical portion of the wheel hub, the inner member outer circumferences includes double row inner raceway surfaces opposing the double row outer raceway surfaces;

double row rolling elements are contained between the inner raceway surfaces and outer raceway surfaces of the inner member and outer member;

a pulser ring is adapted to be fit onto the outer circumference of the inner ring, the pulser ring has magnetic characteristics alternately and equidistantly varying along its circumferential direction;

a cup-shaped sensor cap is secured on an inner-side end of the outer member;

a rotation speed sensor, to detect the rotation speed of the wheel hub, is arranged at a position corresponding to the pulser ring via a predetermined axial air gap;

the sensor cap is press-formed of anti-corrosion steel sheet into a cup-shaped configuration with a cylindrical fitting portion, to be press-fit with the inner side end of the outer member, and a bottom portion, extending radially inward from the fitting portion, to cover the inner-side end of the inner member;

a circular recess is press-formed into the bottom of the sensor cap and the rotation speed sensor can be secured on the sensor cap by fastening a securing bolt to a fastener, such as a nut press-fit into the circular recess, via a mounting flange of the rotation speed sensor;

the rotation speed sensor is oppositely arranged so that it abuts or is positioned in close proximity to the bottom portion, and the rotation speed sensor and pulser ring are opposed with a predetermined axial air gap via the bottom portion; and an elastic member is pressed and elastically deformed between the fitting portion of the sensor cap and the end of the outer member.

15. A wheel bearing apparatus incorporating a rotation speed detecting apparatus comprising:

an outer member integrally formed with a body mounting flange on its outer circumference, the body mounting flange is to be mounted on a body of a vehicle, the outer member inner circumference includes double row outer raceway surfaces;

an inner member includes a wheel hub and at least one inner ring, the wheel hub is integrally formed on its one end with a wheel mounting flange, a cylindrical portion axially extends from the wheel mounting flange, the inner ring is press fit onto the cylindrical portion of the wheel hub, the inner member outer circumferences includes double row inner raceway surfaces opposing the double row outer raceway surfaces;

double row rolling elements are contained between the inner raceway surfaces and outer raceway surfaces of the inner member and outer member;

a pulser ring is adapted to be fit onto the outer circumference of the inner ring, the pulser ring has magnetic characteristics alternately and equidistantly varying along its circumferential direction;

a cup-shaped sensor cap is secured on an inner-side end of the outer member;

a rotation speed sensor, to detect the rotation speed of the wheel hub, is arranged at a position corresponding to the pulser ring via a predetermined axial air gap;

the sensor cap is press-formed of austenitic stainless steel sheet into a cup-shaped configuration with a cylindrical fitting portion, to be press-fit with the inner side end of the outer member, and a bottom portion, extending radially inward from the fitting portion, to cover the inner-side end of the inner member;

a fastener secured with the bottom portion of the sensor cap, the fastener is formed from stainless steel;

the rotation speed sensor is oppositely arranged so that it abuts or is positioned in close proximity to the bottom portion, and the rotation speed sensor and pulser ring are opposed with a predetermined axial air gap via the bottom portion; and an elastic member is pressed and elastically deformed between the fitting portion of the sensor cap and the end of the outer member.

* * * * *